US009195579B2

(12) United States Patent
Kwon et al.

(10) Patent No.: US 9,195,579 B2
(45) Date of Patent: Nov. 24, 2015

(54) PAGE REPLACEMENT METHOD AND MEMORY SYSTEM USING THE SAME

(71) Applicants: Samsung Electronics Co., Ltd., Suwon-si (KR); Research & Business Foundation, Sungkyunkwan University, Suwon-si, Gyeonggi-do (KR)

(72) Inventors: Oh-Seong Kwon, Hwasung (KR); Hwansoo Han, Seoul (KR); Sun-Young Lim, Hwasung (KR); Seonggun Kim, Hwasung (KR)

(73) Assignees: Samsung Electronics Co., Ltd. (KR); Research & Business Foundation, Sungkyunkwan University (KR)

( * ) Notice: Subject to any disclaimer, the term of this patent is extended or adjusted under 35 U.S.C. 154(b) by 382 days.

(21) Appl. No.: 13/754,161

(22) Filed: Jan. 30, 2013

(65) Prior Publication Data

US 2013/0262738 A1    Oct. 3, 2013

(30) Foreign Application Priority Data

Apr. 3, 2012    (KR) .......................... 10-2012-0034429

(51) Int. Cl.
| | |
|---|---|
| G06F 12/00 | (2006.01) |
| G06F 12/02 | (2006.01) |
| G06F 12/08 | (2006.01) |
| G06F 12/12 | (2006.01) |

(52) U.S. Cl.
CPC ............ *G06F 12/0238* (2013.01); *G06F 12/08* (2013.01); *G06F 12/121* (2013.01); *G06F 12/0246* (2013.01); *G06F 2212/205* (2013.01); *G06F 2212/222* (2013.01)

(58) Field of Classification Search
CPC .. G06F 12/0246; G06F 12/0897; G06F 12/08
See application file for complete search history.

(56) References Cited

U.S. PATENT DOCUMENTS

| | | |
|---|---|---|
| 5,493,663 A | 2/1996 | Parikh |
| 6,683,817 B2 | 1/2004 | Wei et al. |
| 6,950,919 B2 | 9/2005 | Sharma et al. |
| 7,197,633 B2 | 3/2007 | Rommelmann et al. |
| 7,321,966 B2 | 1/2008 | Koontz et al. |
| 7,334,261 B2 | 2/2008 | Koontz et al. |
| 7,526,059 B1 | 4/2009 | Shen et al. |
| 8,266,367 B2 | 9/2012 | Yu et al. |
| 2006/0041938 A1 | 2/2006 | Ali |

(Continued)

FOREIGN PATENT DOCUMENTS

KR    10-2010-0067248 A    6/2010

*Primary Examiner* — Cheng-Yuan Tseng
*Assistant Examiner* — Arvind Talukdar
(74) *Attorney, Agent, or Firm* — Myers Bigel Sibley & Sajovec, PA

(57) ABSTRACT

A memory system includes a central processing unit (CPU), a nonvolatile memory electrically coupled to the CPU and a main memory, which is configured to swap an incoming code page for a target code page therein, in response to a first command issued by the CPU. The main memory can be configured to swap the target code page in the main memory to the nonvolatile memory in the event a page capacity of the main memory is at a threshold capacity. The CPU may also be configured to perform a frequency of use analysis on the target code page to determine whether the target code page is to be swapped to the nonvolatile memory or discarded. The incoming code page may be provided by a disk drive storage device and the main memory may be a volatile memory.

6 Claims, 9 Drawing Sheets

(56) References Cited

U.S. PATENT DOCUMENTS

| | | | |
|---|---|---|---|
| 2006/0294304 A1* | 12/2006 | Brown et al. | 711/115 |
| 2009/0216945 A1* | 8/2009 | Shimada | 711/113 |
| 2010/0299513 A1 | 11/2010 | Ryu et al. | |
| 2010/0312955 A1 | 12/2010 | Hwang et al. | |
| 2010/0318727 A1 | 12/2010 | Lee et al. | |
| 2012/0151127 A1* | 6/2012 | Lim | 711/103 |
| 2013/0117497 A1* | 5/2013 | Cui et al. | 711/103 |
| 2013/0198435 A1* | 8/2013 | Sandadi et al. | 711/103 |

* cited by examiner

PAGE REPLACEMENT METHOD AND MEMORY SYSTEM USING THE SAME

REFERENCE TO PRIORITY APPLICATION

A claim for priority under 35 U.S.C. §119 is made to Korean Patent Application No. 10-2012-0034429, filed Apr. 3, 2012 in the Korean Intellectual Property Office, the entire contents of which are hereby incorporated herein by reference.

FIELD

The present invention relates to integrated circuit systems and, more particularly, to memory-based integrated circuit systems and methods of operating same.

BACKGROUND

A memory system may include a memory device storing data and a host controlling the memory device. The memory device may be volatile or nonvolatile. Volatile memory devices may include DRAM, SRAM, and the like. Nonvolatile memory devices may include EEPROM, FRAM, PRAM, MRAM, flash memory, and the like. Data stored in a volatile memory device may be lost at power-off. On the other hand, data stored at a nonvolatile memory device may be kept even at power-off.

In a memory system, a part of a disk may be used as a virtual memory to overcome limits in a physical memory capacity when a process is executed. A page required for execution of a current process may be first loaded onto a physical memory of a memory system using a page swap technique. Although loaded on the physical memory, a page judged to be currently unnecessary may be swapped out to a virtual memory. When execution on the swapped-out page is required later, the swapped-out page may be swapped into the physical memory from the virtual memory.

SUMMARY

Example embodiments of the inventive concept provide a memory system including a CPU, a nonvolatile memory configured to directly exchange data with the CPU and a main memory configured to store data loaded from a disk and the nonvolatile memory at an operation of the CPU. In particular, the nonvolatile memory can be used as a swap device of the main memory and the CPU can swap a code page selected as a replacing target to the nonvolatile memory from the main memory.

In some embodiments of the invention, the CPU swaps the code page selected as a replacing target according to a frequency of use. In other embodiments of the invention, the main memory includes a page table referred by the CPU and the page table includes refault bit values indicating a replacing number of each of code pages stored at the main memory. For example, when a refault bit value of a code page selected as a replacing target is over a predetermined value, the CPU swaps the code page selected as a replacing target.

According to additional embodiments, the CPU selects a replacing target according to a Least Recently Used (LRU) policy. For example, when a replacing target is selected, the CPU grants a priority according to types of pages and whether a swap operation is performed in advance. The priority can be first granted to a previously swapped code page.

According to further embodiments of the invention, when a code page needed at execution of a process exists at the nonvolatile memory, not the main memory, the code page stored at the nonvolatile memory is loaded onto the main memory. However, when a code page does not exist at the nonvolatile memory, a code page stored at the disk is loaded onto the main memory.

Example embodiments of the inventive concept also provide a page replacing method of a memory system which includes a CPU, a nonvolatile memory configured to directly exchange data with the CPU and a main memory configured to store data loaded from a disk and the nonvolatile memory at an operation of the CPU. The page replacing method comprises selecting a replacing target of the main memory according to a page replacing policy; and when the selected replace target is a code page, determining swapping from the main memory to the nonvolatile memory according to a frequency of use. This page replacing method may further include performing the swapping regardless of a frequency of use when the selected replace target is a data page. The page replacing method may also include judging the frequency of use according to a refault bit. The refault bit increases whenever a code page is selected as a replacing target.

In example embodiments, the selecting a replacing target comprises granting a priority according to types of pages. In example embodiments, the priority is granted further in light of whether a page is swapped in advance. In example embodiments, the priority is first of all granted to a previously swapped code page.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Figure 1:
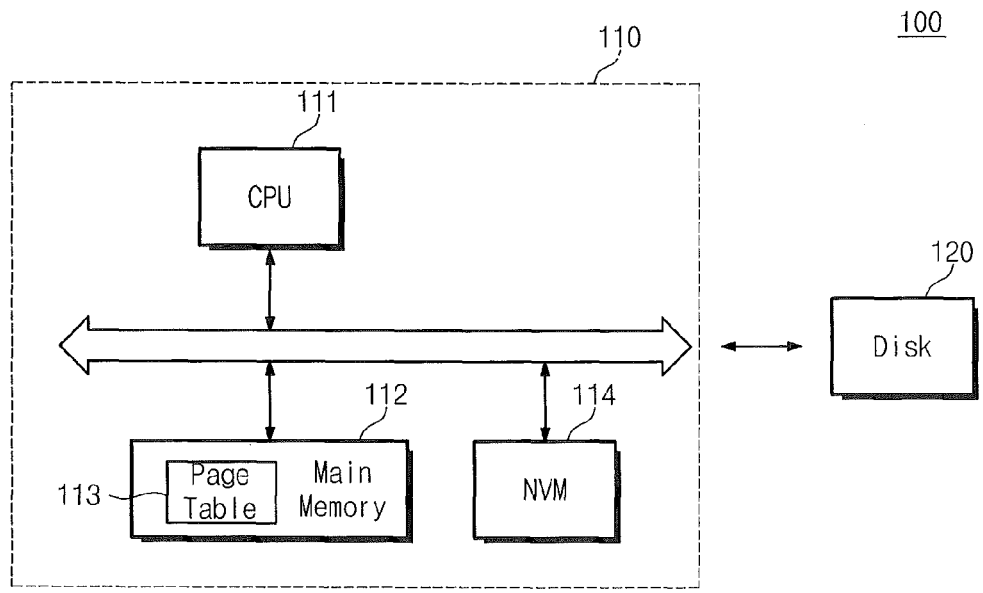
FIG. 1 is a block diagram schematically illustrating a memory system according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a memory system according to an embodiment of the inventive concept. Referring to FIG. 1, a memory system 100 may include a controller 110 and a disk 120. The controller 110 may include a CPU 111, a main memory 112, and a nonvolatile memory 114. The memory system 100 according to an embodiment of the inventive concept may manage data by a page unit. That is, a page may be used as a unit that data is moved at a time. The page may be divided into a code page and a data page. The code page may be a page having a command. The original of the code page may be stored at the disk 120. When a code page requested at execution of a process does not exist at the main memory 112 or the nonvolatile memory 114, the code page may be loaded onto the main memory 112 from the disk 120. The data page may be a page having data being an object of the code page. The data page may not exist at the disk 120 as the original. The data page may be first assigned at the main memory 112, and may only exist at the main memory 112 and the nonvolatile memory 114.

The CPU 111 may control an overall operation of the memory system 100. The CPU 111 may control data writing and reading on the main memory 112, the nonvolatile memory 114, and the disk 120. The CPU 111 may directly access the main memory 112 and the nonvolatile memory 114. The CPU 111 may indirectly access the disk 120.

When a page is requested from a host according to execution of a process, the CPU 111 may obtain a current physical address of the requested page based on a page table 113. The page table 113 may be used to record page mapping information. The page table 113 may include mapping information between logical addresses and physical addresses on pages. The page table 113 may include a dirty bit indicating whether a page was written, a present bit indicating whether a page currently exists at the main memory 112, and the like. The page table 113 may exist on the main memory 112.

The CPU 111 may check whether a requested page exists at the main memory 112. When the requested page does not exist in the main memory 112, the CPU 111 may obtain a physical address from a logical address of the requested page based on the page table 113. The CPU 111 may generate an interrupt to load the requested page onto the main memory 112 from a location directed by a physical address.

The CPU 111 may update the page table 113 with information changed according to execution of a process. For example, a physical address of a page is changed or a page is changed into a dirty page from a clean page, the CPU 111 may record the changed information at the page table 113.

The main memory 112 may directly exchange data with the CPU 111. The main memory 112 may store a page needed for execution of the CPU 111. The main memory 112 may be a volatile memory. For example, the main memory 112 may be DRAM or SRAM. However, the inventive concept is not limited thereto.

In example embodiments, the nonvolatile memory 114 may be used as a swap device of the main memory 112. The nonvolatile memory 114 may directly exchange data with the CPU 111. Thus, a speed of the nonvolatile memory 114 may be equal to the main memory 112. The nonvolatile memory 114 may be a phase change memory (PRAM), a magnetic random access memory (MRAM), a ferromagnetic random access memory (FRAM), or a flash memory. However, the inventive concept is not limited thereto.

The disk 120 may be a storage device storing data. The disk 120 may be a nonvolatile memory which retains data stored therein even at power-off. The disk 120 may be a flash memory storage device, a hard disk drive (HDD), or a solid state drive (SSD). However, the inventive concept is not limited thereto. The disk 120 may indirectly exchange data with the CPU 111. Data stored at the disk 120 may be loaded onto the main memory 112 to be processed by the CPU 110.

A conventional memory system may use a part of a disk as a swap space. In this case, a page swapped out from a main memory may be stored at the disk. On the other hand, the memory system 100 of the inventive concept may use the nonvolatile memory 114 as a swap device.

An access speed between the main memory 112 and the nonvolatile memory 114 may be higher than that between the main memory 112 and the disk 120. Thus, the memory system 100 of the inventive concept may shorten latency by loading data from the nonvolatile memory 114 rather than the disk 120.

In case of a conventional memory system, when a memory is insufficient, a victim code page may be discarded, not swapped. On the other hand, in case of the memory system 100 of the inventive concept, a frequently used code page may be swapped out to be stored at a swap device. Thus, the memory system 100 of the inventive concept may use a corresponding page without accessing the disk 120. Also, when a memory is insufficient or a process is resumed, the memory system 100 of the inventive concept may further shorten latency.

Figure 2:
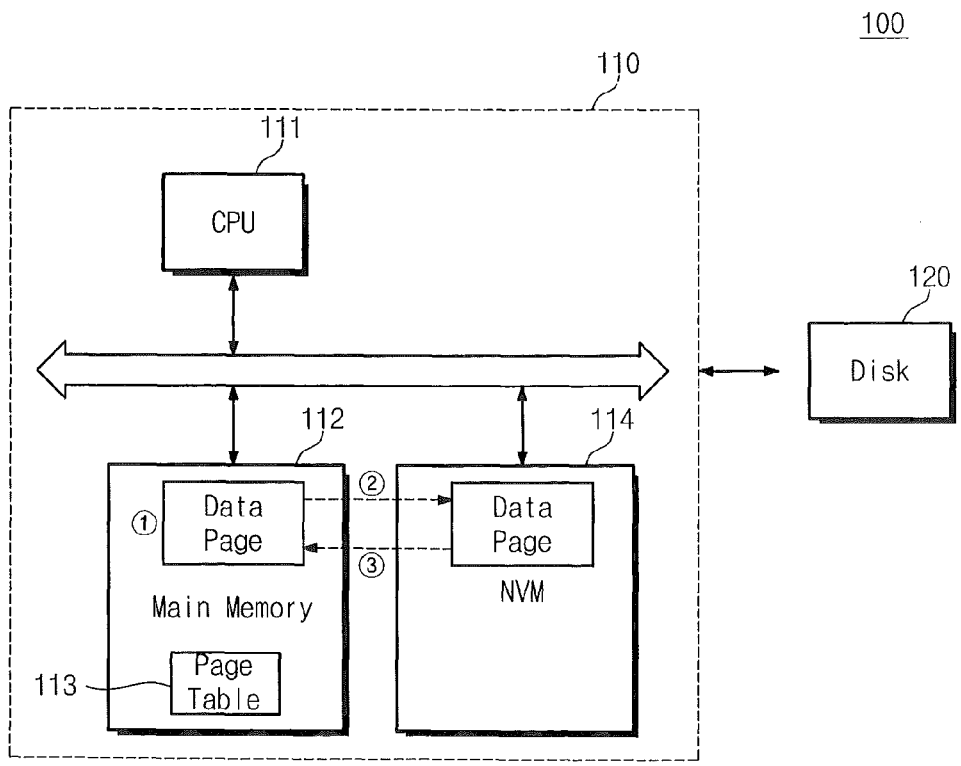
FIG. 2 is a diagram illustrating a life cycle of a data page in a memory system of the inventive concept.

FIG. 2 is a diagram illustrating a life cycle of a data page in a memory system of the inventive concept. Below, a life cycle of a data page stored at a main memory 112 will be described with reference to FIGS. 1 and 2. If a data page is first requested from a host according to execution of a process, a CPU 111 may assign a space for a data page to the main memory 112 (①). A data page stored at the main memory 112 may be referred and used according to execution of a process. As a page is continuously stored at the main memory 112 according to execution of a process, a space of the main memory 112 for storing additional pages may become deficient. In this case, the CPU 111 may perform a page replacing operation on pages stored at the main memory 112. With the page replacing operation, a specific page stored at the main memory 112 may be appointed to a victim page, and a page to be newly used may be stored at the main memory 112 instead of a page to be replaced. The page to be replaced may be discarded or swapped out to a nonvolatile memory 114. If a data page is selected as a replacing target, it may be swapped out, not discarded. That is, the selected data page may be removed from the main memory 112 to be stored at the nonvolatile memory 114 (②). When the CPU 111 requests referring to the data page, the data page may be swapped in to the main memory 112 from the nonvolatile memory 114 (③). That is, a page data stored at the nonvolatile memory 114 may be loaded onto the main memory 112. The loaded data page may exist at the main memory 112 until it becomes a replacing target.

Thus, if the data page is stored at the main memory 112 and then is appointed as a replacing target, it may be swapped out to the nonvolatile memory 114 anytime. Since the nonvolatile memory 114 may direct exchange data with the CPU 111, its access speed may be faster than that of a disk. Thus, compared with a conventional memory system, the memory system 100 of the inventive concept may shorten latency by loading a data page onto the main memory 112.

Figure 3:
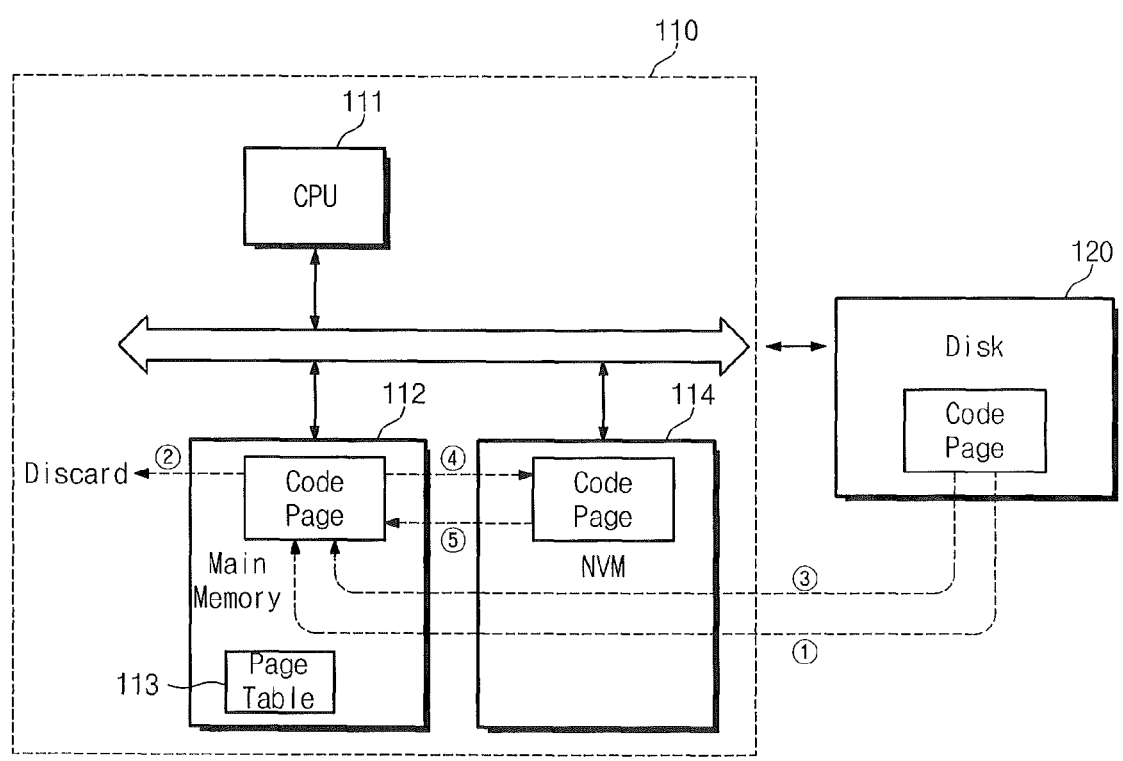
FIG. 3 is a diagram illustrating a life cycle of a code page in a memory system of the inventive concept.

FIG. 3 is a diagram illustrating a life cycle of a code page in a memory system of the inventive concept. Below, a life cycle of a code page stored at a main memory will be described with reference to FIGS. 1 and 3. If a code page is first requested from a host according to execution of a process, a code page stored at a disk 120 may be loaded onto the main memory 112 (①). The code page loaded onto the main memory 112 may be referred and used according to execution of a process. As a memory of the main memory 112 becomes insufficient according to execution of a process, a CPU 111 may perform a page replacing operation on pages stored at the main memory 112. If a code page is selected as a victim page, it may be discarded. That is, the selected code page may be removed from the main memory 112 (②). When the CPU 111 requests referring to the code page, the code page may be swapped in to the main memory 112 (③). A page table 113 of the inventive concept may further include a refault bit formed of two bits to confirm a frequency of use of a code page. The refault bit may increase by 1 whenever a code page is appointed to a replacing target to be discarded.

Figure 4:
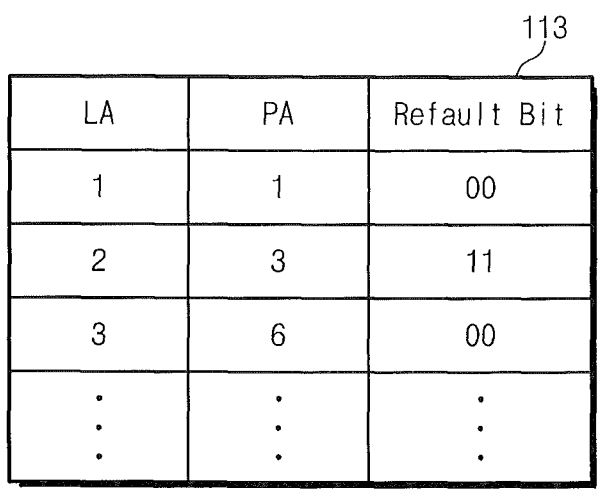
FIG. 4 is a table illustrating a page table according to an embodiment of the inventive concept.

FIG. 4 is a table illustrating a page table according to an embodiment of the inventive concept. Referring to FIG. 4, refault values of pages having logical addresses of 1 and 3 may be '00'. This may mean that they are not once selected as a replacing target. On the other hand, a refault value of a page having a logical address of 2 may be '11'. This may mean that it is selected three times as a replacing target. If a code page is again selected as a replacing target, a refault bit of the selected code page may be checked. If a refault value of the selected code page is below 3, it may be discarded (②). If pages having logical addresses of 1 and 3 are code pages and selected as a replacing target, they may be discarded. A code page having a refault bit value more than two (2) may be judged to be a page frequently used. In this case, the code page may be swapped out to a nonvolatile memory 114, not discarded (④). In FIG. 4, in the event that a page having a logical address of 2 is a code page, it may be swapped out to the nonvolatile memory 114. In a case where a page is not discarded but swapped out, a refault bit value may not increase. If a host requests referring to a swapped-out code page, a CPU 111 may search a physical address of a code page based on the page table. Since the code page is swapped out to the nonvolatile memory 114, the CPU 111 may swap in the code page to a main memory 112 from the nonvolatile memory 130 using a physical address stored at the page table 113 (⑤). The loaded code page may rest at the main memory 112 until it is again selected as a replacing target. Although the loaded code data is again set to a replacing target, it may not be swapped out. The reason may be that the loaded code page is stored at the nonvolatile memory 114.

Thus, if a code page is loaded from a disk 120 and then is set to a replacing target, it may be swapped out to the nonvolatile memory 114 according to a frequency of use. Since an access speed of the nonvolatile memory 114 is faster than that of the disk 120, a memory system 100 of the inventive concept may shorten latency taken to load a code page onto the main memory 112. Also, the memory system 100 of the inventive concept may be efficient in a memory capacity and a management cost. The reason may be that a code page having a high frequency of use is selectively stored. In other words, all code pages may not be stored at the nonvolatile memory 114.

In example embodiments, a refault bit may be defined and used to measure the frequency of use of each code page. However, the inventive concept is not limited thereto. Also, whether a code page is discarded three times may be used as a reference for judging the frequency of use. However, the inventive concept is not limited thereto.

In example embodiments, a code page or a data page may be set to a replacing target when a capacity of the main memory 112 becomes insufficient. However, the inventive concept may not be limited to an example that setting of a page to a replacing target is limited to the case that a capacity of the main memory 112 becomes insufficient. For example, a page can be set to a replacing target according to a predetermined condition. A page set to a replacing target may be swapped out to the nonvolatile memory 114 according to the frequency of use.

Figure 5:
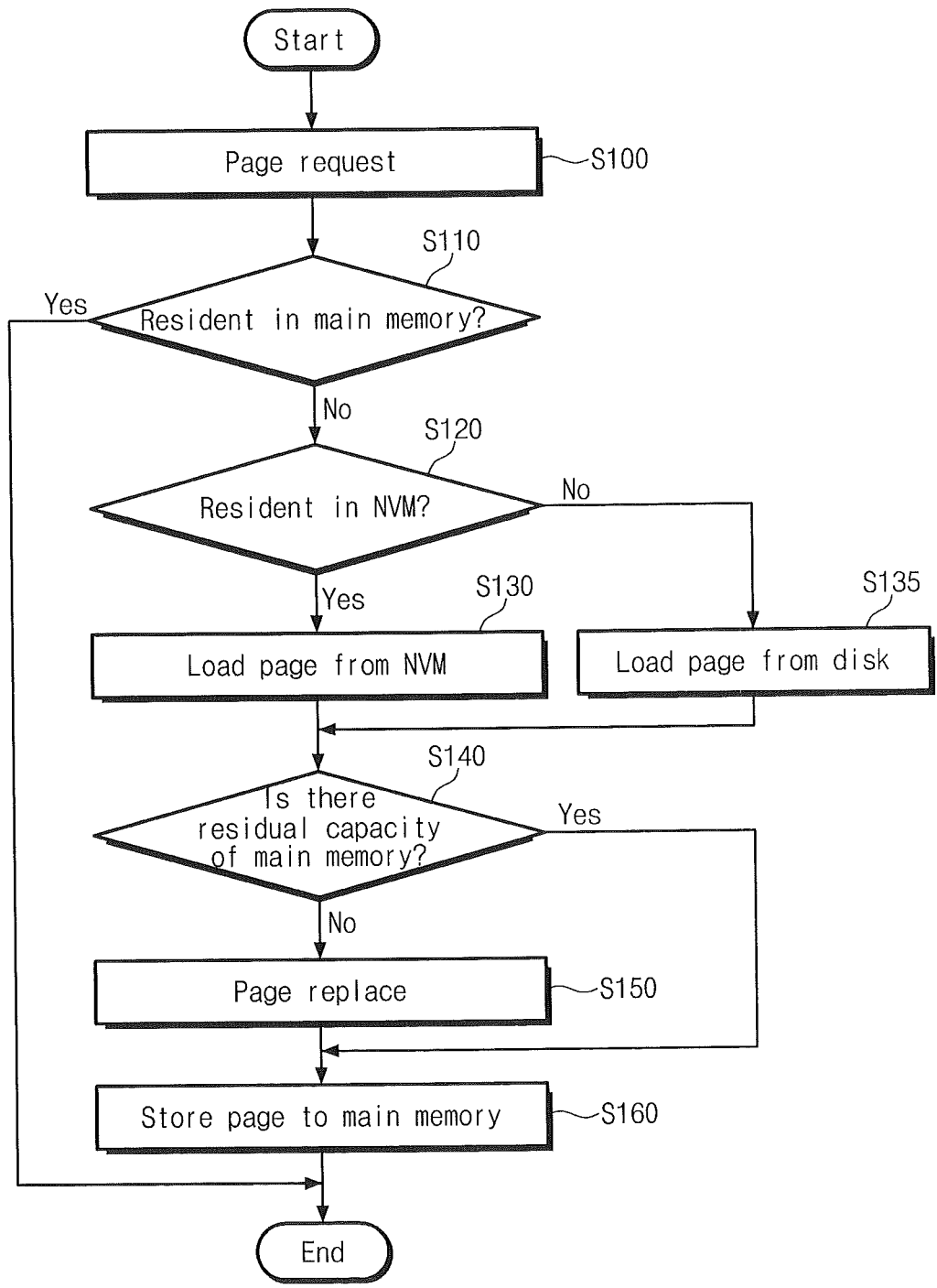
FIG. 5 is a flowchart illustrating a page swapping method according to an embodiment of the inventive concept.

FIG. 5 is a flowchart illustrating a page swapping method according to an embodiment of the inventive concept. Below, a page swapping method will be more fully described with reference to accompanying drawings. In operation S100, a host may request a code page and a data page needed for execution of a process from a CPU 111. In operation S110, whether a requested page is resident in a main memory 112 may be judged. If so, a process may be executed according to a page stored at the main memory 112. When the requested page is not resident in a main memory 112, in operation S120, whether the requested page is swapped to a nonvolatile memory 114 may be judged. When the requested page is resident in a main memory 112, S130, a page stored at the nonvolatile memory 114 may be loaded onto the main memory 112. When the requested page is not resident in a main memory 112, in operation S135, the requested page may be loaded onto the main memory 112 from a disk 120. In operation S140, whether a space of the main memory 112 remains may be judged to store the loaded page at the main memory 112. If a space of the main memory 112 is judged to remain, the loaded page may be stored at the main memory 112. In the event that storing of the loaded page is impossible due to lack of a space of the main memory 112, a page replacing operation may be executed. In operation S160, the loaded page may be stored at the main memory 112 instead of a page selected as a replacing target. With the page swapping method of the inventive concept, since the nonvolatile memory 114 is used as a swap device instead of the disk 120, latency may be shortened.

Figure 6:
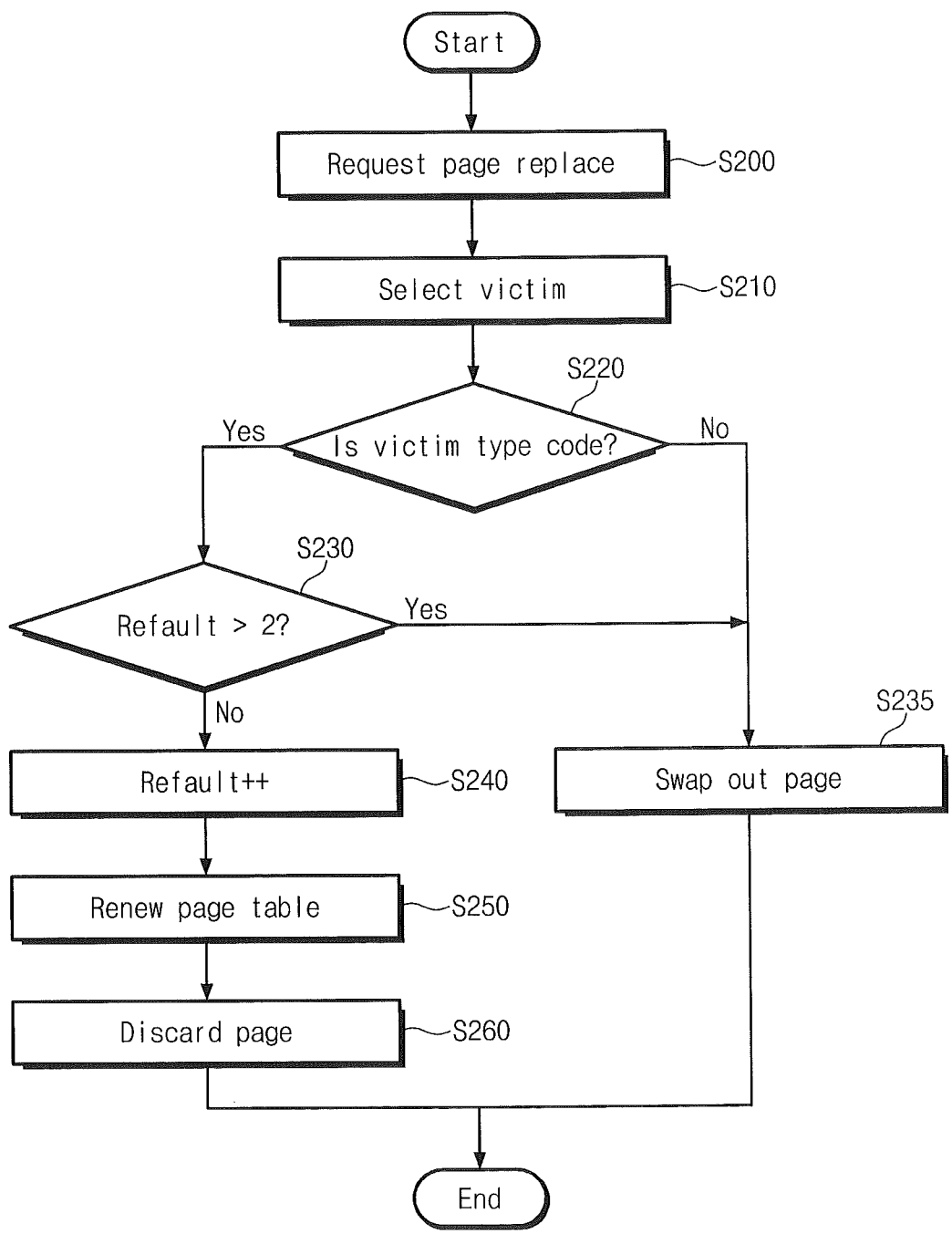
FIG. 6 is a flowchart illustrating a page replacing method according to an embodiment of the inventive concept.

FIG. 6 is a flowchart illustrating a page replacing method according to an embodiment of the inventive concept. Below, a page replacing method will be more fully described with reference to accompanying drawings. When a space of a main memory 112 is insufficient, in operation S220, a CPU 111 may request a page replacing operation on the main memory 112. When the page replacing operation is requested, in operation S210, a victim page may be selected according to a page replacing policy. The page replacing policy may be a policy for selecting a page to be replaced. Page replacing may be made according to various page replacing policies. For example, the page replacing policy may include Random Page Replacement (RPR), First In First Out (FIFO), Least Recently Used (LRU), and the like.

In example embodiments, the page replacing policy may be Least Recently Used (LRU). With the Least Recently Used (LRU), a page, not used for a long time, from among pages stored at the main memory 112 may be selected as a replacing target. However, the inventive concept is not limited thereto.

If a replacing target is selected, in operation S220, whether the selected page is a data page or a code page may be judged. If the selected page is a data page, in operation S235, the selected page may be swapped out to a nonvolatile memory 114. If the selected page is a code page, in operation S230, a refault bit of the selected page may be judged referring to a page table 113. If a refault bit value is more than 2, the selected page may be judged to be a frequently used page, so that it is swapped out to the nonvolatile memory 114.

When a swapping-out operation is performed, first, whether the nonvolatile memory 114 includes a usable page frame may be judged. In the event that a capacity of the nonvolatile memory 114 is insufficient, a page set to a replacing target may be removed according to a page replacing policy on the nonvolatile memory 114.

In example embodiments, the above-described least frequently used policy may be used the page replacing policy on the nonvolatile memory 114. When a page selected as a replacing target on the nonvolatile memory 114 is a code page, the selected code page may be discarded from the nonvolatile memory 114, and a corresponding refault bit may be set to '0'.

If the refault bit value of the selected page is less than 2, a CPU 111 may increase a refault bit value of the selected page by 1. In operation S250, the CPU 111 may revise a page table 113 with respect to the changed refault bit value of the selected page. In operation S260, the page selected as a replacing target may be discarded.

In addition, the priority on each page may be established with respect to an operation of selecting a replacing target. The priority may be granted according to types of pages and whether a swapping operation is performed in advance. In the event that pages having the same frequency of use exist when a replacing target is selected according to the LRU policy, a replacing target may be selected from a page having the higher priority.

In example embodiments, the priority may be selected in this order of a previously swapped code page, an un-swapped code page, and a data page. If a code page previously swapped to a nonvolatile memory 114 is selected as a replacing target first of all, the number of writing data at the nonvolatile memory 114 may be reduced, thus being efficient.

With the above-described page replacing method of the inventive concept, a page set to a replacing target may be divided into a code page and a data page. When a code page is a replacing target, a swapping operation may be decided according to the frequency of use of the selected page. Although a requested code page is loaded onto the nonvolatile memory 114 during execution of a process, a frequently used code page may be swapped to a swap device to be loaded rapidly.

Figure 7:
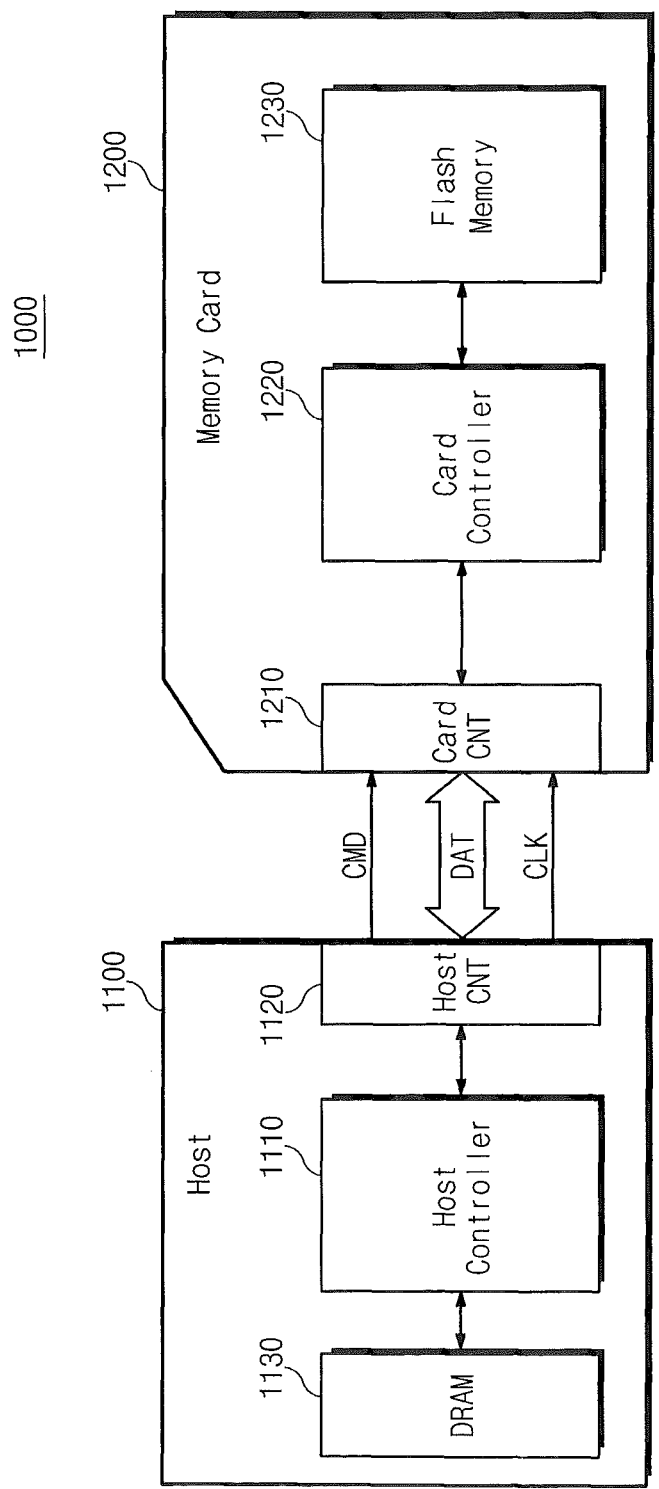
FIG. 7 is a block diagram schematically illustrating a memory card system to which a memory system according to an embodiment of the inventive concept can be applied.

FIG. 7 is a block diagram schematically illustrating a memory card system to which a memory system according to an embodiment of the inventive concept is applied. A memory card system 1000 may include a host 1100 and a memory card 1200. The host 1100 may include a host controller 1110, a host connection unit 1120, and a DRAM 1130.

The host 1100 may write data in the memory card 1200 and read data from the memory card 1200. The host controller 1110 may send a command (e.g., a write command), a clock signal CLK generated from a clock generator (not shown) in the host 1100, and data to the memory card 2200 via the host connection unit 2120. The DRAM 1130 may be a main memory of the host 1100.

The memory card 1200 may include a card connection unit 1210, a card controller 1220, and a flash memory 1230. The card controller 1220 may store data in the flash memory 1230 in response to a command input via the card connection unit 1210. The data may be stored in synchronization with a clock signal generated from a clock generator (not shown) in the card controller 1220. The flash memory 1230 may store data transferred from the host 1100. For example, in a case where the host 1100 is a digital camera, the flash memory 1230 may store image data.

In the memory card system 1000 in FIG. 7, the card controller 1220 may include a nonvolatile memory (not shown) as a swap device. As described above, latency needed for a page swapping operation may be shortened by using the nonvolatile memory as a swap device.

Figure 8:
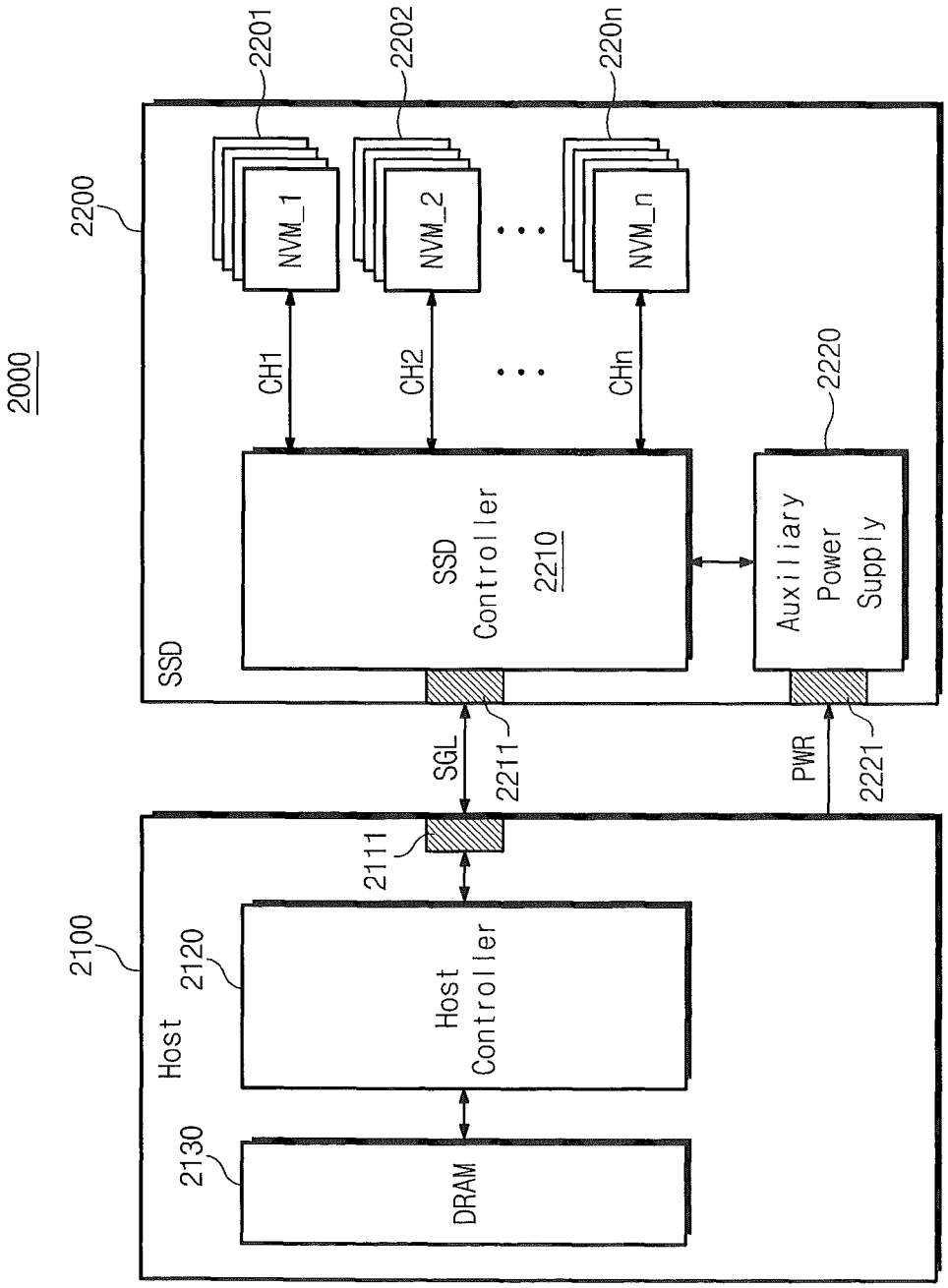
FIG. 8 is a block diagram illustrating a solid state drive system in which a memory system according to the inventive concept can be applied.

FIG. 8 is a block diagram illustrating a solid state drive system in which a memory system according to the inventive concept is applied. Referring to FIG. 8, a solid state drive (SSD) system 2000 may include a host 2100 and an SSD 2200. The host 2100 may include a host interface 2111, a host controller 2120, and a DRAM 2130.

The host 2100 may write data in the SSD 2200 or read data from the SSD 2200. The host controller 2120 may transfer signals SGL such as a command, an address, a control signal, and the like to the SSD 2200 via the host interface 2111. The DRAM 2130 may be a main memory of the host 2100.

The SSD 2200 may exchange signals SGL with the host 2100 via the host interface 2211, and may be supplied with a power via a power connector 2221. The SSD 2200 may include a plurality of nonvolatile memories 2201 through 220*n*, an SSD controller 2210, and an auxiliary power supply 2220. Herein, the nonvolatile memories 2201 to 220*n* may be implemented by not only a NAND flash memory but also PRAM, MRAM, ReRAM, and the like.

The plurality of nonvolatile memories 2201 through 220*n* may be used as a storage medium of the SSD 2200. The plurality of nonvolatile memories 2201 to 220*n* may be connected with the SSD controller 2210 via a plurality of channels CH1 to CHn. One channel may be connected with one or more nonvolatile memories. Nonvolatile memories connected with one channel may be connected with the same data bus.

The SSD controller 2210 may exchange signals SGL with the host 2100 via the host interface 2211. Herein, the signals SGL may include a command, an address, data, and the like. The SSD controller 2210 may be configured to write or read out data to or from a corresponding nonvolatile memory according to a command of the host 2100. The SSD controller 2210 will be more fully described with reference to FIG. 9.

The auxiliary power supply 2220 may be connected with the host 2100 via the power connector 2221. The auxiliary power supply 2220 may be charged by a power PWR from the host 2100. The auxiliary power supply 2220 may be placed within the SSD 2200 or outside the SSD 2200. For example, the auxiliary power supply 2220 may be put on a main board to supply an auxiliary power to the SSD 2200.

Figure 9:
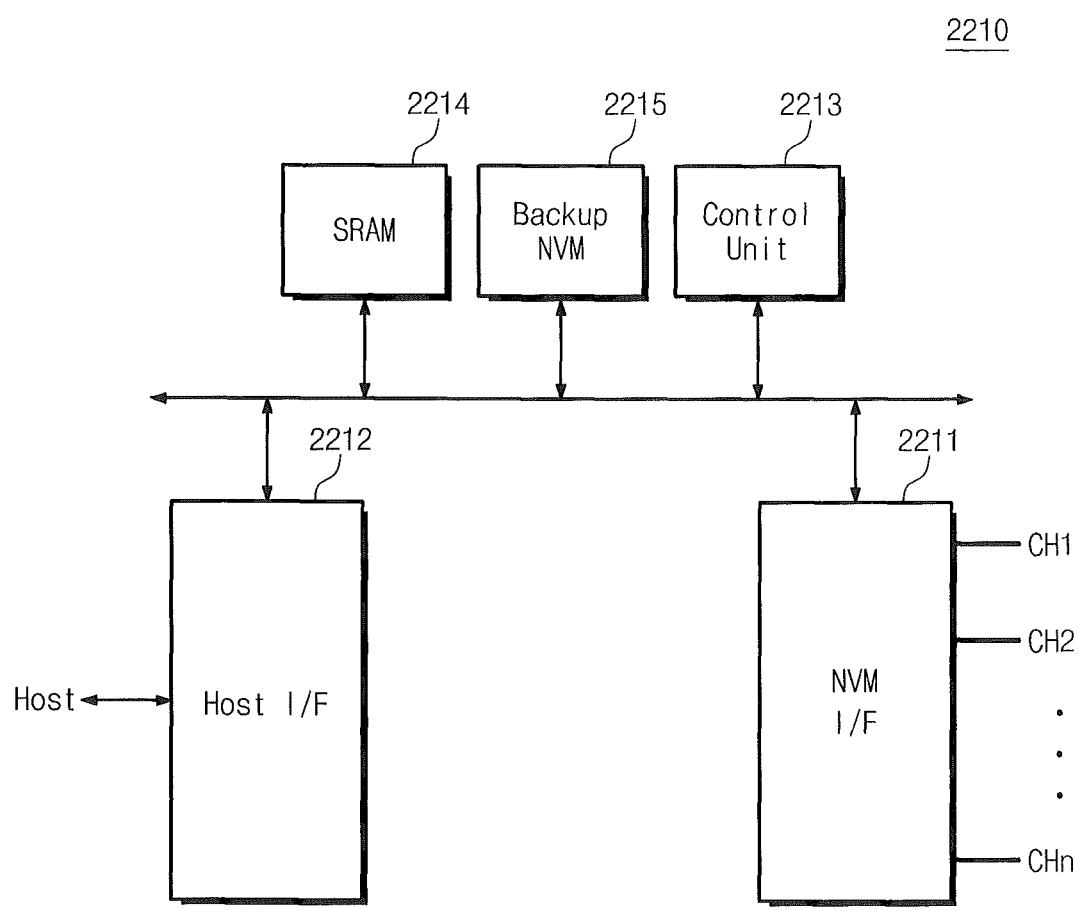
FIG. 9 is a block diagram schematically illustrating an SSD controller in FIG. 8.

FIG. 9 is a block diagram schematically illustrating an SSD controller in FIG. 8. Referring to FIG. 9, an SSD controller 2210 may include an NVM interface 2211, a host interface 2212, a control unit 2213, an SRAM 2214, and a backup nonvolatile memory 2215. The NVM interface 2211 may scatter data transferred from a main memory of a host 2100 to channels CH1 to CHn, respectively. The NVM interface 2211 may transfer data read from nonvolatile memories 2201 to 220*n* to a host 2100 via the host interface 2212.

The host interface 2212 may provide an interface with an SSD 2200 according to the protocol of the host 3100. The host interface 2212 may communicate with the host 2100 using USB (Universal Serial Bus), SCSI (Small Computer System Interface), PCI express, ATA, PATA (Parallel ATA), SATA (Serial ATA), SAS (Serial Attached SCSI), etc. The host interface 2212 may perform a disk emulation function which enables the host 2100 to recognize the SSD 2200 as a hard disk drive (HDD).

The control unit 2213 may analyze and process a signal SGL input from the host 2100. The control unit 2213 may control the host 2100 or the nonvolatile memories 2201 to 220*n* through the host interface 2212 or the NVM interface 2211. The control unit 2213 may control the nonvolatile memories 2201 to 220*n* according to firmware for driving the SSD 2200.

The SRAM 2214 may be used to drive software which efficiently manages the nonvolatile memories 2201 to 220*n*. The SRAM 2214 may store metadata input from a main memory of the host 2100 or cache data. At a sudden power-off operation, metadata or cache data stored in the SRAM 2214 may be stored in the nonvolatile memories 2201 to 220*n* using an auxiliary power supply 2220.

The backup nonvolatile memory 2215 may be used as a swap device of the SRAM 2214. The backup nonvolatile memory 2215 may be configured to store a data page stored at the SRAM 2214. Also, the backup nonvolatile memory 2215 may be configured to store a code page stored at the SRAM 2214 according to a frequency of use.

Returning to FIG. 8, an SSD system 2000 according to an embodiment of the inventive concept may use the backup nonvolatile memory 2215 as a swap device of the SRAM 2214. Thus, an operating speed may be improved by shortening latency needed at a page swapping operation.

In FIGS. 8 and 9, the SRAM 2214 may be replaced with a nonvolatile memory. The SRAM 2214 of the SSD system 2000 can be replaced with a nonvolatile memory such as PRAM, RRAM, MRAM, or the like.

Figure 10:
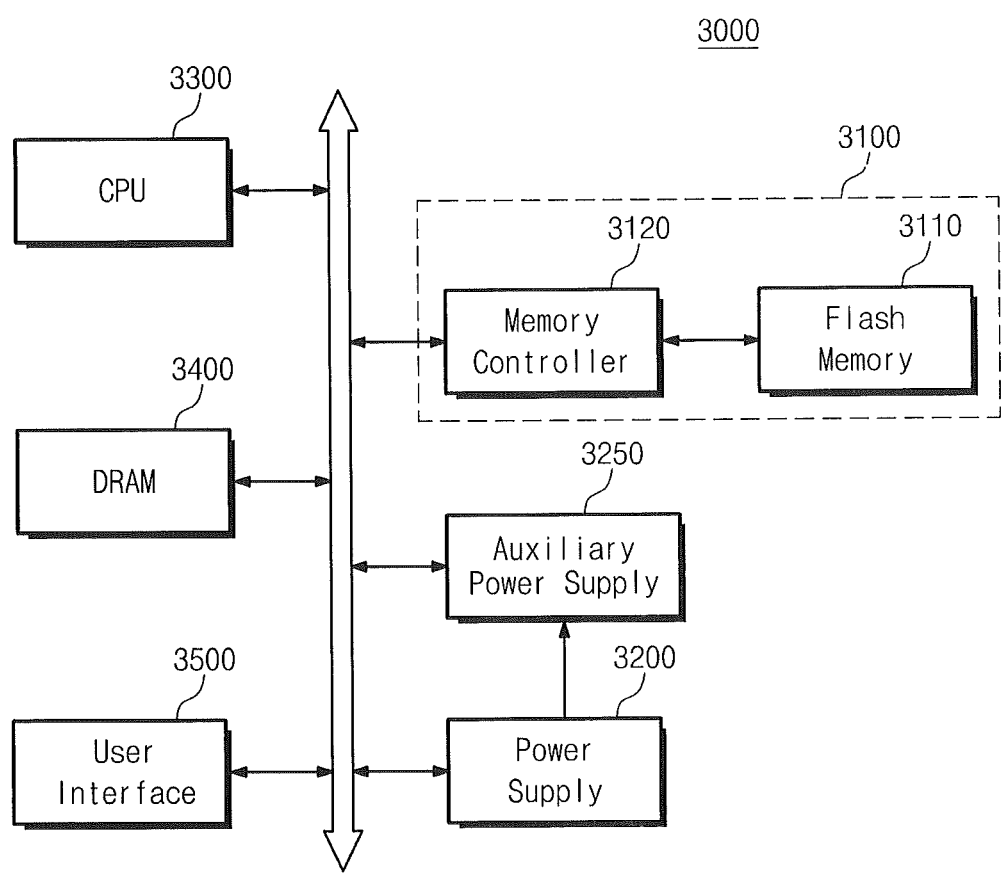
FIG. 10 is a block diagram schematically illustrating an electronic device including a memory system according to an embodiment of the inventive concept.

FIG. 10 is a block diagram schematically illustrating an electronic device including a memory system according to an embodiment of the inventive concept. Herein, an electronic device 3000 may be a personal computer or a handheld electronic device such as a notebook computer, a cellular phone, a PDA, a camera, and the like.

Referring to FIG. 10, the electronic device 3000 may include a memory system 3100, a power supply device 3200, an auxiliary power supply 3250, a CPU 3300, a DRAM 3400, and a user interface 3500. The memory system 3100 may include a flash memory 3110 and a memory controller 3120. The memory controller 3120 may include a backup nonvolatile memory as a swap device. The memory system 3100 can be embedded within the electronic device 3000.

As described above, the electronic device 3000 according to an embodiment of the inventive concept may use the backup nonvolatile memory as a swap device. Thus, an operating speed may be improved by shortening latency needed at a page swapping operation.

The inventive concept may be modified or changed variously. For example, a CPU, a main memory, a nonvolatile memory, and a disk may be changed or modified variously according to environment and use.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory system, comprising:
   a central processing unit (CPU);
   a nonvolatile flash memory electrically coupled in the memory system to communicate with said CPU; and
   a main memory configured to swap an incoming code page read from a nonvolatile non-flash memory for a target code page therein, in response to a first command issued by said CPU;

wherein said main memory is configured to swap the target code page in said main memory to said nonvolatile flash memory in the event a page capacity of said main memory is at a threshold capacity; and wherein said main memory includes a page table configured to maintain refault bit values therein, which indicate for each of a plurality of code pages stored in said main memory how many times the corresponding code pages have been discarded from said main memory without being written into said nonvolatile flash memory.

2. The memory system of claim 1, wherein said CPU is configured to perform a frequency of use analysis on the target code page by accessing the page table to determine whether the target code page is to be swapped into said nonvolatile flash memory or discarded because the corresponding refault bit value indicates an insufficient number of prior discards associated with the target code page.

3. The memory system of claim 1, wherein the nonvolatile non-flash memory is a disk drive storage device.

4. A memory system, comprising:
a CPU;
a nonvolatile memory configured to directly exchange data with the CPU; and
a main memory configured to store data loaded from a disk and the nonvolatile memory in response to operation of the CPU;
wherein the nonvolatile memory is used as a swap device of the main memory;
wherein the CPU swaps a code page selected as a replacing target to the nonvolatile memory from the main memory; and
wherein said main memory includes a page table configured to maintain refault bit values therein, which indicate for each of a plurality of code pages stored in said main memory how many times the corresponding code pages have been discarded from said main memory without being written into said nonvolatile memory.

5. The memory system of claim 4, wherein the CPU selects a replacing target according to a Least Recently Used (LRU) policy.

6. A method of operating a memory system containing a volatile main memory, a nonvolatile flash memory and a nonvolatile disk drive memory therein, said method comprising:

swapping a first incoming code page read from the disk drive memory for a target code page within the main memory, in response to a first CPU command, said main memory containing a page table configured to maintain refault bit values therein, which indicate for each of a plurality of code pages stored in the main memory, including the target code page, how many times each corresponding code page has been discarded from the main memory without being written into the flash memory; and swapping a second incoming code page read from the disk drive memory for the first incoming code page within the main memory, in response to a second CPU command, by evaluating a first refault bit value associated with the first incoming code page and then either: (i) discarding the first incoming code page from the main memory upon determining that the first refault bit value has a magnitude less than a predetermined threshold, or (ii) transferring the first incoming code page from the main memory to the flash memory upon determining that the first refault bit value has a magnitude at or greater than the predetermined threshold.

* * * * *